Dec. 1, 1925.                                                1,563,434
J. PRATER
WEEDER
Filed Aug. 13, 1923                      2 Sheets-Sheet 1
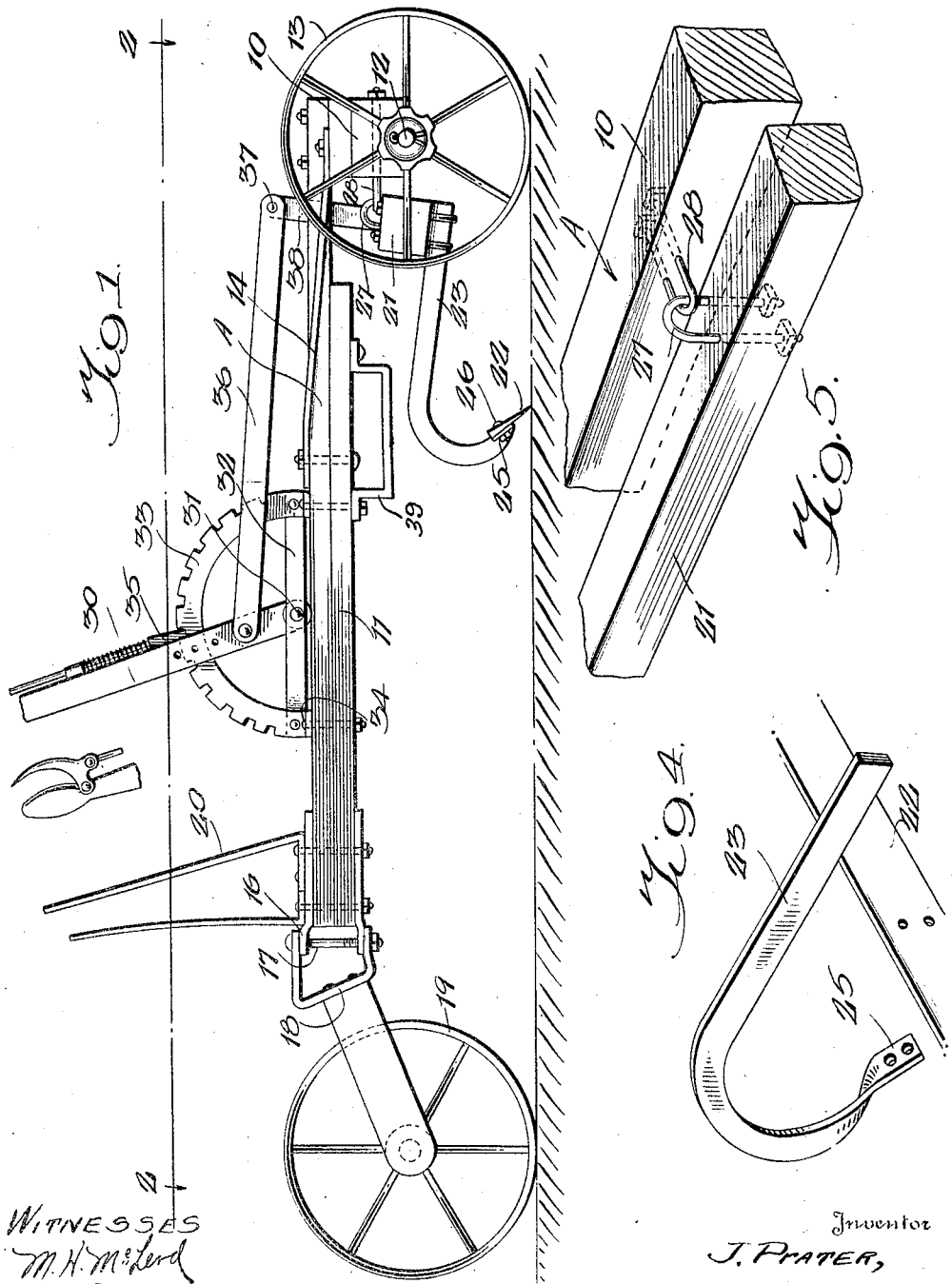
Inventor
J. PRATER,

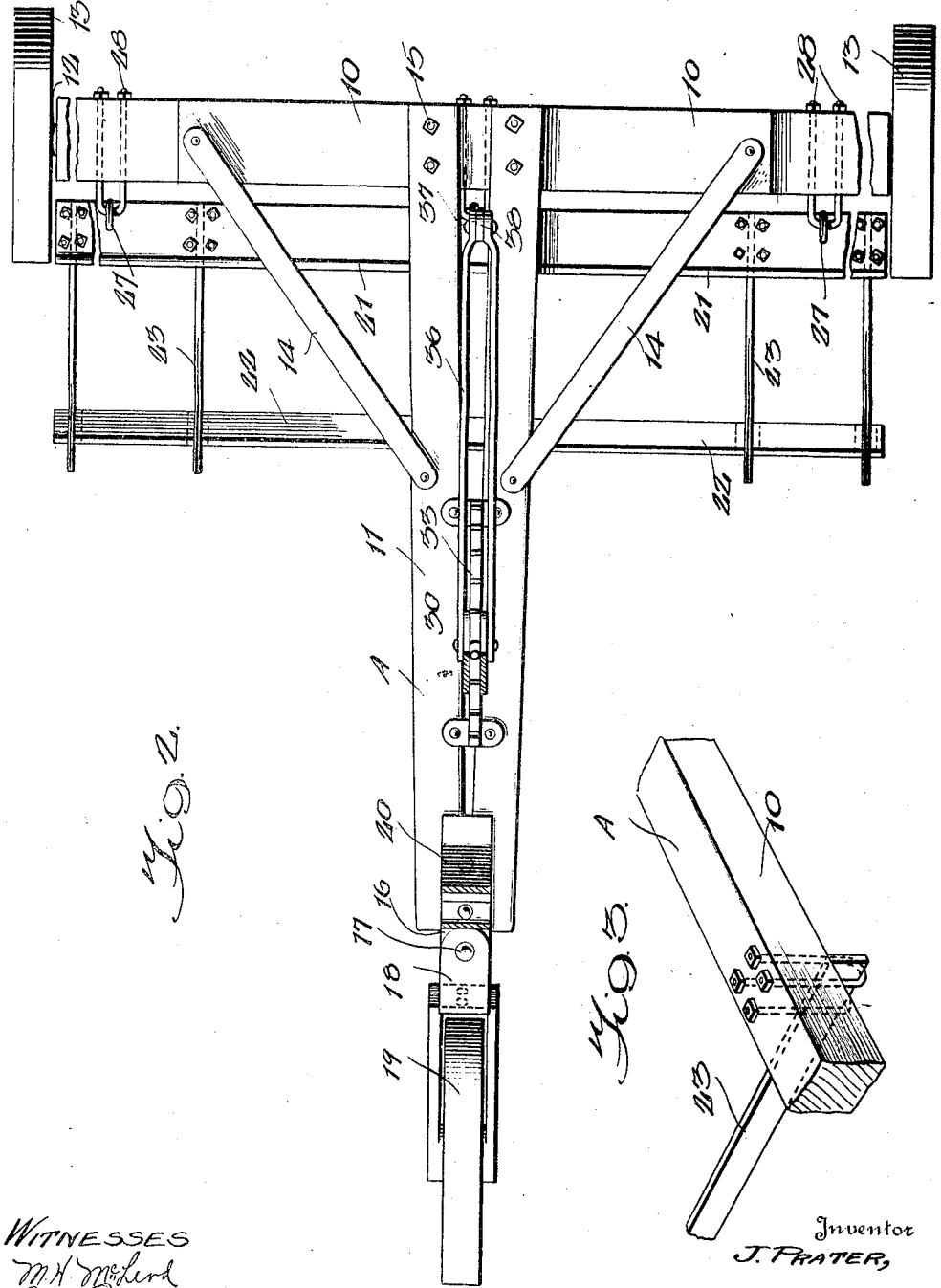

Patented Dec. 1, 1925.

1,563,434

UNITED STATES PATENT OFFICE.

JOHN PRATER, OF STANFIELD, OREGON.

WEEDER.

Application filed August 13, 1923. Serial No. 657,119.

*To all whom it may concern:*

Be it known that I, JOHN PRATER, a citizen of the United States, residing at Stanfield, in the county of Umatilla and State of Oregon, have invented certain new and useful Improvements in a Weeder, of which the following is a specification.

This invention appertains to vital improvements in farming implements and the primary object of the invention is to provide a type of weeder in which the weeding blade can be readily lifted into and out of operative position.

Another prime object of the invention is to provide an improved wheeled weeding implement embodying a transversely extending main beam and a transverse extending weeding blade arranged in spaced parallel relation to the main beam and extending the full length thereof, and novel means for associating the weeding blade with the main beam to permit the raising and lowering thereof.

A further prime object of the invention is to provide a weeding implement embodying a main beam, supporting ground wheels therefor, a weeding blade arranged in spaced parallel relation to the main beam, and a swivelled trailing wheel for facilitating the guiding of the implement.

A still further object of the invention is to provide an approved weeder of the above character which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed and illustrated in the accompanying drawings, in which drawings, Figure 1 is a side elevation of the improved weeder, Figure 2 is a plan view of the same, showing parts thereof in section, Figure 3 is a fragmentary detail perspective view illustrating the beam for carrying the weeder blade, Figure 4 is a fragmentary detail perspective view, illustrating the weeder blade and the arms for carrying the same, and Figure 5 is a fragmentary detail perspective view illustrating the means for connecting the beam for carrying the weeder blade with the main beam.

Referring to the drawings, wherein similar characters designate corresponding parts throughout the several views, the letter A generally indicates the improved weeder, which comprises a main transverse extending beam 10 and a main centrally disposed longitudinally extending beam 11. The beam 10 supports at its opposite terminals stub axles 12, upon which are rotatably mounted suitable ground supporting wheels 13. As shown, diagonal brace bars 14 are employed for bracing the connection between the beams 10 and 11. The forward end of the beam 11 is connected by means of bolts 15 with the beam 10.

The rear end of the beam 11 supports a casting 16, to which is pivoted by means of a pivot bolt 17 a yoke 18, which in turn carries the rear supporting wheel 19. A suitable seat support 20 is bolted to the upper surface of the beam 11, adjacent to the rear end thereof, as clearly shown in Figures 1 and 2 of the drawings.

Arranged in spaced parallel relation with the beam 10 is a secondary beam 21 which is utilized for supporting the weeder blade 22. It is to be noticed that the weeder blade 22 is arranged at an angle to the vertical, so as to give a shearing action when engaging the weeds.

Rearwardly extending arms 23 are bolted or otherwise secured to the secondary beam 21, and these arms have formed on their rear ends depending arcuate feet 25, to which is bolted, as at 26, the weeder blade 22.

The beam 21 is pivotally connected to the main beam 10 in any prescribed way, and as shown are provided U-shaped shackles 27 and 28 carried respectively by the beam 21 and the beam 10 for this purpose. By this arrangement it is obvious that the beam 21 is free to swing on the beam 10.

I also provide means permitting the raising and lowering of the beam 21 to facilitate the positioning of the weeder blade 22 in relation to the ground.

The means for raising and lowering the beam 21 consists of a hand lever 30 which is pivoted at its lower end as at 31 to a suitable strip 32 which is carried by the lower end of a segment rack 33. This segment rack 33 is bolted or otherwise secured, as at 34, to the main longitudinally extending beam 11. Any preferred type of dog mechanism 35 is carried by the lever 30 for engaging the segment rack 33 to hold the lever in its adjusted position. Pivotally secured to the lever 30, adjacent to its lower end, is a forwardly extending link 36, which is in turn pivotally connected, as at 37, to an upwardly extending arm 38, which is bolted to the upper surface of the beam 21.

By manipulating the lever 30, it can be seen that the weeder blade can be raised or lowered.

The beam 11 carries a depending casting 39 disposed in the path of the weeder blade 32, so that when the weeder blade is raised, the same engages the casting 29 which will facilitate the knocking of earth clods and the like therefrom.

It is to be understood that the forward end of the beam 10 can support any preferred type of draft appliance not shown to permit the driver of the machine to be pulled across a field to be weeded.

From the foregoing description it can be seen that I have provided an exceptionally simple and durable weeder in which the blade can be readily regulated in relation to the ground.

Changes in detail may be made without departing from the spirit or scope of this invention.

What I claim as new is:

A weeder of the character described comprising a frame including a longitudinally extending beam consisting of a pair of spaced bars, a transverse beam connected to the forward terminals of said bars, ground wheels associated with the terminals of the transverse beam, a caster wheel carried by the rear end of the longitudinally extending beam, a transversely extending implement carrying beam disposed in spaced parallel relation to the transverse frame beam, means pivotally connecting the implement carrying beam to the transverse beam, arcuate arms rigidly connected with the implement carrying beam extending downwardly and rearwardly therefrom, a transversely extending weeder blade secured to the lower ends of the arms and arranged substantially the full width of the frame, a pivoted lever secured to the longitudinally extending beam, an upwardly extending arm rigidly connected with the implement beam, a link connecting the lever to said arm, and a ratchet and pawl mechanism for holding the lever in any preferred adjusted position, the lever being arranged between the bars of the longitudinally extending beam.

In testimony whereof I affix my signature.

JOHN PRATER.